United States Patent [19]

Sargent et al.

[11] Patent Number: 4,586,724

[45] Date of Patent: May 6, 1986

[54] HITCH ASSEMBLY

[75] Inventors: Ronald S. Sargent, Kenilworth; Bryan J. Morris, Coventry, both of United Kingdom

[73] Assignee: Massey-Ferguson Services N.V., Curacao, Netherlands Antilles

[21] Appl. No.: 597,998

[22] Filed: Apr. 9, 1984

[30] Foreign Application Priority Data

Apr. 8, 1983 [GB] United Kingdom ............... 8309569

[51] Int. Cl.$^4$ .............................................. B60D 1/00
[52] U.S. Cl. ..................................... 280/412; 172/311; 280/656
[58] Field of Search ............ 250/411 R, 411 A, 411 B, 250/411 C, 412, 413, 656, 410, 456 R, 456 A, 459, 462, 467, 472, 409; 172/311, 314, 679

[56] References Cited

U.S. PATENT DOCUMENTS

| 2,709,085 | 5/1955 | Streland | 280/467 |
|---|---|---|---|
| 3,606,848 | 9/1971 | Dobbs et al. | 172/311 |
| 3,731,748 | 5/1973 | Sullivan et al. | 172/314 |
| 4,178,010 | 12/1979 | Gerber | 280/412 |
| 4,213,628 | 7/1980 | Hardesty | 280/412 |
| 4,415,174 | 11/1983 | Koehn | 172/314 |

FOREIGN PATENT DOCUMENTS 2021913 12/1979 United Kingdom ............... 280/412

Primary Examiner—Joseph F. Peters, Jr.
Assistant Examiner—Mark C. Dukes
Attorney, Agent, or Firm—Robert L. Farris

[57] ABSTRACT

A hitch assembly comprising a hitch bar 1 having a hitch 2 for attachment to a tractor at its leading end; a pair of drawbars 4,5, each having one end pivotally connected to the hitch bar 1 so as to be swingable in a substantially horizontal plane between a work position in which it extends laterally to the direction of travel, one on each side of the hitch bar, and with the outer end of one bar 5 extending rearwards further than the outer end of the other drawbar 4, and a transport position in which it trails rearwards of the work position; a support wheel 8,16 attached to the outer end of each drawbar 4,5; a hitch 10,18 on each drawbar for attachment to an implement, the hitch 18 on said one drawbar trailing behind that on said other drawbar in the work position; and a pair of stay-bars 23,24 each having one end pivotally connected to the hitch bar 1 so as to be swingable in a substantially horizontal plane between work and transport positions, each stay bar 23,24 in its work position being connectable by a fastening 27,28 to a respective one of the drawbars 4,5 to hold the drawbar in said work position. A wheel assembly 13 is connected to the outer end of the drawbar 5 by a pivotal connection 14 with a vertical axis about which the wheel assembly 13 can pivot relative to the drawbar 5 in moving the latter from the work to the transport position. The drawbar 4 is held in its transport position by its stay bar 23 with the drawbar 4 trailing rearwards at an angle to the direction of travel.

7 Claims, 3 Drawing Figures

HITCH ASSEMBLY

FIELD OF THE INVENTION

This invention relates to a hitch assembly suitable for towing a pair of agricultural implements such as grain drills behind a tractor in side-by-side relationship.

BACKGROUND OF THE INVENTION

In many farming operations it is desirable to tow two implements across a field in side-by-side relationship so as to operate on the soil over the widest possible width in one pass of the tractor. Hitch assemblies designed for this purpose are also generally designed so that they can be used to tow both implements in tandem relationship behind the tractor to and from work.

OBJECTS AND SUMMARY OF THE PRESENT INVENTION

Known hitches of the above kind tend to be rather bulky and cumbersome, especially when it is desired to store them. An object of the present invention is to provide a hitch that is improved in these respects.

According to the invention, a hitch assembly comprises a hitch bar having a hitch for attachment to a tractor at its leading end; a pair of drawbars each having one end pivotally connected to the hitch bar so as to be swingable in a substantially horizontal plane between a work position in which it extends laterally to the direction of travel, one on each side of the hitch bar, and with the outer end of one drawbar extending rearwards further than the outer end of the other drawbar, and a transport position in which it trails rearwards of the work position; a support wheel attached to the outer end of each drawbar; a hitch on each drawbar for attachment to an implement, the hitch on said one drawbar trailing behind that on said other drawbar in the work position; and a pair of tie bars each having one end pivotally connected to the drawbar so as to be swingable in a substantially horizontal plane between work and transport positions, each tie bar in its work position being connectable by a fastening to a respective one of the drawbars to hold the drawbar in said work position.

Preferably, the outer end of said one drawbar and the corresponding tie bar are connected to a hitch plate that carries the trailing implement hitch and the support wheel. The support wheel has a fixed axis that extends perpendicular to the direction of travel and that in the work position, lies sufficiently far behind the leading implement hitch so that when an implement is connected to the leading hitch with its wheel axis held perpendicular to the direction of travel, the axis of the support wheel is aligned with this wheel axis and all of the wheels move on turning circles with a common centre.

The connection between said one drawbar and the hitch plate comprises at least one pivotal connection about which the hitch plate is pivoted to maintain the wheel axis perpendicular to the direction of travel when the drawbar is moved to the transport position. Preferably, the drawbar and respective tie bar extend rearwards substantially parallel to one another in the transport position.

Preferably, a castor wheel is provided at the outer end of said other drawbar. Further, this drawbar is swingable between a work position in which it extends substantially perpendicular to the direction of travel, and a transport position in which it is held by the tie bar so that it trails rearwards but is still angled to the direction of travel. Thus, the two support wheels are spaced apart transversely to form a stable hitch assembly for transporting two implements connected in tandem.

Preferably, said other drawbar and respective tie bar are swingable to storage positions in which they also extend rearwards substantially parallel to one another.

The invention will now be described by way of example with reference to the accompanying drawings in which

DESCRIPTION OF A PREFERRED EMBODIMENT

Figure 1:
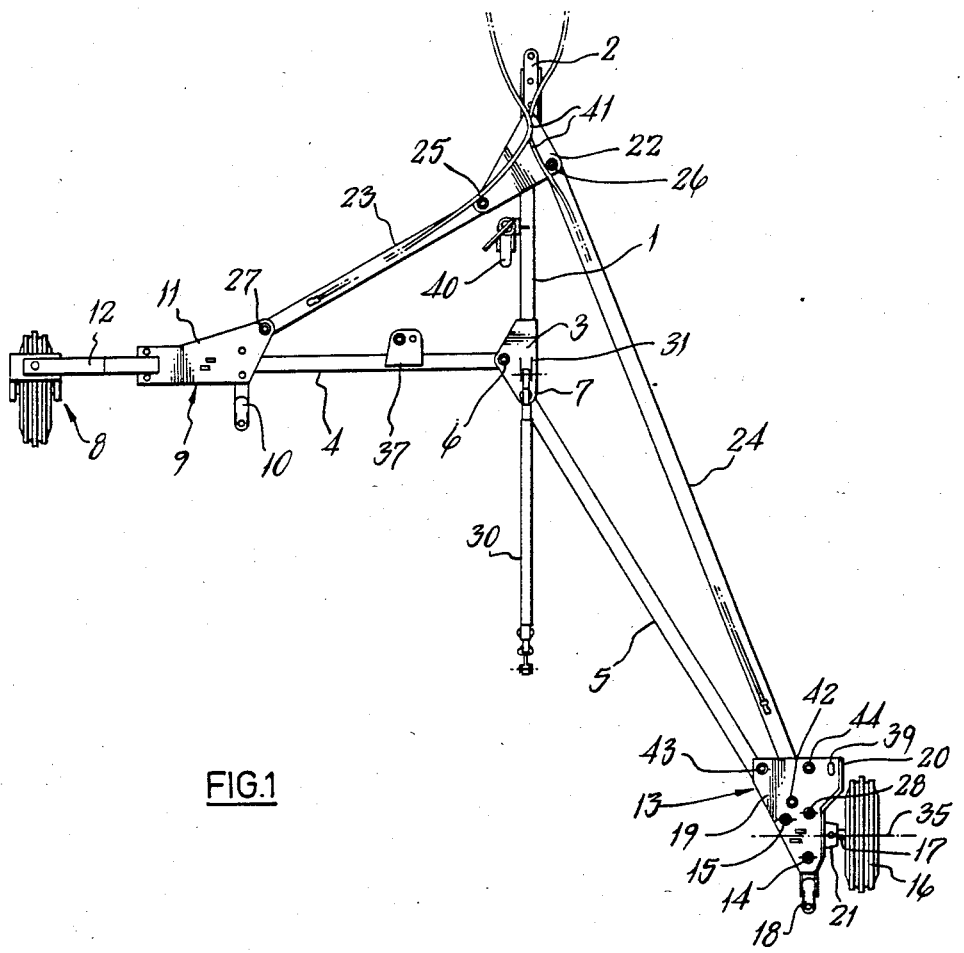
FIG. 1 is a plan view of a hitch assembly according to the invention showing the hitch assembly in the work condition for trailing a pair of drills in side-by-side relationship.

The illustrated hitch assembly comprises a hitch bar 1 that carries a tractor hitch 2 at its leading end. A pair of horizontal mounting plates 3 are fixed to the rear end of the hitch bar 1 top and bottom, and the end of each of two drawbars 4,5 is received therebetween and retained by a respective vertical pivot pin 6,7. The pivot 6 for the drawbar 4 is located on the left-hand side of the hitch bar 1, and the drawbar 4 extends substantially perpendicularly from the left-hand side of the hitch bar 1 when in the work position, shown in FIG. 1. The pivot 7 for the drawbar 5 is located just beyond the rear end of the hitch bar 1, and the drawbar 5 extends rearwards and sidewards to the right-hand side of the hitch bar when in the work position.

A castor wheel assembly 8 is connected to the outer end of the left-hand draw-bar 4, via an intermediate hitch plate assembly 9 that carries an implement hitch 10 projecting rearwards from the drawbar. The hitch plate assembly 9 comprises a pair of horizontal plates 11 secured either side of the drawbar 4, and the castor wheel assembly 8 is supported from an upwardly projecting leg 12 that is connected to the plates 11.

A hitch plate assembly 13 is connected to the outer end of the right-hand drawbar 5 by a pair of pins 14,15 and carries a support wheel 16 with a fixed axle 17 that extends perpendicular to the hitch bar 1, and an implement hitch 18 that projects rearwards therefrom. The assembly 13 comprises a pair of horizontal plates 19 joined by a web 20 therebetween along the outer edges of the plates, the axle 17 being secured to the web 20 via a bracket 21 and the drawbar 5 being received between the plates 19 with the pins 14, 15 passing therethrough.

A second pair of horizontal mounting plates 22 are fixed to the top and bottom of the hitch bar 1 behind the tractor hitch 2, and the inner end of each of a pair of tie bars 23,24 is pivotally connected therebetween by pivot pins 25,26 with one tie bar on each side of the hitch bar. The tie bar 23 on the left-hand side is received between the plates 11 and connected by a pin 27 to the hitch plate assembly 9 to hold the drawbar 4 in its work position, and the tie bar 24 on the right-hand side is received between the plates 19 and connected by a pin 28 to the hitch plate assembly 11 to hold the drawbar 5 in its work position.

Figure 2:
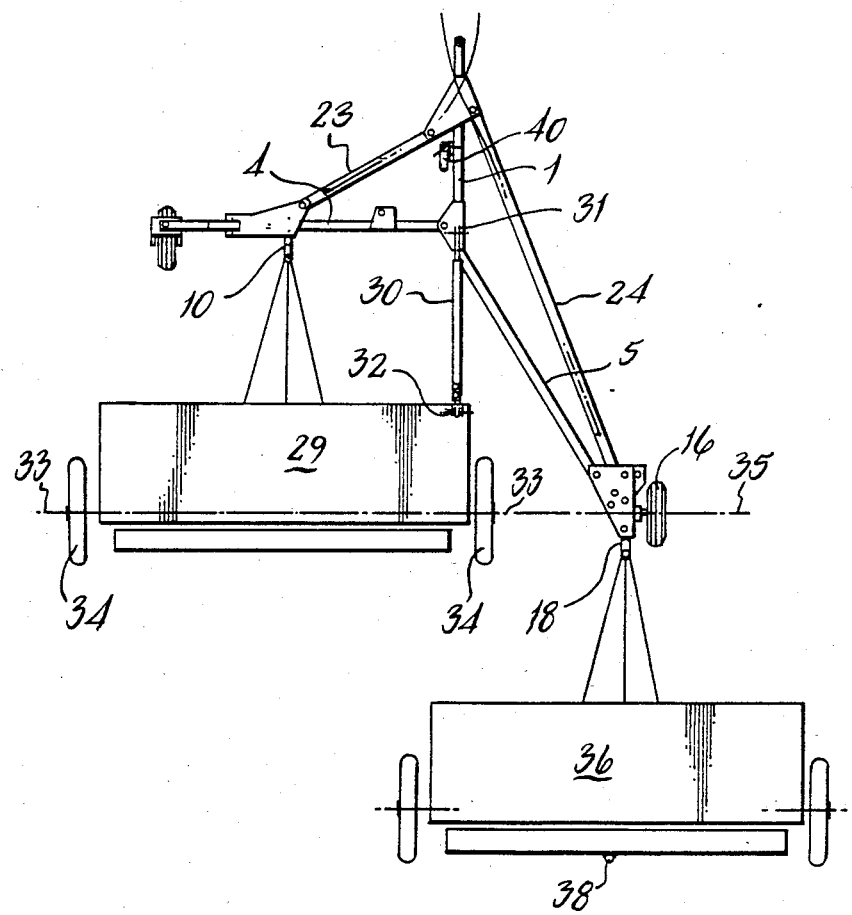
FIG. 2 is the same view as FIG. 1 but also shows a pair of drills attached for sowing.

When the hitch assembly is in use for sowing two bouts simultaneously, as shown in FIG. 2, one drill 29 is connected to the left-hand hitch 10 and a tie bar 30 of adjustable length is connected between brackets 31 on the top mounting plate 3 and a bracket 32 on the drill so that the axis 33 of the wheels 24 of the drill extends perpendicular to the direction of travel.

The geometry of the hitch assembly is such that this axis 33 of the drill wheels is aligned with the axis 35 of the support wheel 14 and thus all three wheels have turning circles with a common centre. A second drill 36 is connected to the right-hand hitch 18 and trails freely behind it, the geometry of the hitch assembly being such that the effective sowing width of each drill runs alongside that of the other without overlapping or leaving an unnecessary gap therebetween.

Figure 3:
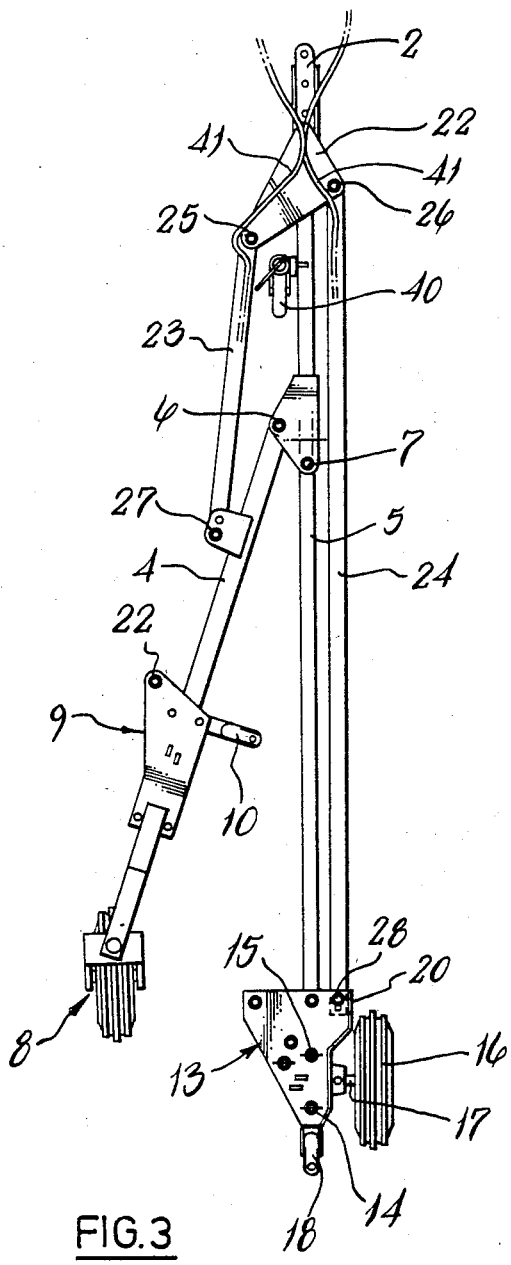
FIG. 3 is a plan view similar to that of FIG. 1 but with the hitch assembly shown in the transport condition for trailing a pair of drills in tandem relationship.

Once sowing is completed, the hitch assembly can be set in a transport condition in which it can tow both drills in tandem, as shown in FIG. 3. In order to do this, the pin connection 27 between the left-hand drawbar 4 and the tie bar 23 is released so that the drawbar and tie bar can be folded inwards to the transport position. The tie bar 23 is reconnected to the drawbar 4 to hold it in the transport position by engagement of the pin 27 between the outer end of the tie bar and a pair of connecting brackets 37 mounted on the drawbar between the hitch plate assembly 1 and the mounting plates 3.

The pin connections 15, 28 between the hitch plate assembly 11 and the tie bar 24 and right-hand drawbar 5 are released to allow both the drawbar and tiebar to be folded inwards to the transport position. The operator pulls on the hitch 18 to move the drawbar to the transport position, the hitch plate assembly 13 pivoting about pin 14 so that the wheel 16 runs freely. The pin 15 is then re-engaged to lock the hitch plate assembly 13 in its transport position with the axle of the support wheel 16 perpendicular to the direction of travel. The rear end of the tiebar 24 then lies between the plates 19 against the outer web 20 and the pin 28 is re-engaged by insertion through slots 39 in the plates 19.

One drill 36 is connected to the implement hitch 18 and the other drill 29 is connected to a hitch 38 at the rear of the drill 36.

In the transport condition, the tie 30 can be removed or folded back on itself so as to project forwards from the bracket 31.

A jockey wheel 40 is provided on the hitch bar 1 to assist support and manoeuvering of the hitch assembly when connecting and unconnecting the tractor and implements.

The hydraulic lines 41 for each drill are secured along the tiebars 23, 24 and terminate in quick-release couplings.

As illustrated, the hitch assembly is adapted for use with pairs of drills of different width by providing three different pin connection points 42, 43, 44 on the hitch plate assembly 13 for the pins 14, 15 and 28. When using these alternative connection points it will be appreciated that the drawbar extends sidewards further from the hitch bar 1 there shown in FIG. 2, and a pair of wider drills can therefore be used.

When the hitch assembly is to be stored, the drawbar 5 and tie bar 24 are folded inwards to the parallel position, as shown in FIG. 3, and the drawbar 4 and tie bar 23 are uncoupled by removing the pin 27 and folded fully inwards to extend rearwards parallel to one another and the drawbar 5 and tie bar 24. The hitch assembly then assumes a compact structure that occupies minimum storage space.

We claim:

1. A hitch assembly comprising a hitch bar having a hitch for attachment to a tractor at its leading end; a pair of drawbars each having one end pivotally connected to the hitch bar so as to be swingable in a substantially horizontal plane between a work position in which it extends laterally to the direction of travel, one on each side of the hitch bar, and with the outer end of one drawbar extending rearwards further than the outer end of the other drawbar, and a transport position in which each trails rearwards of the work position; a wheel assembly that carries a support wheel with its axis in a fixed orientation relative to the wheel assembly; a connection between said one drawbar and the wheel assembly comprising a pivotal connection with a vertical axis about which the wheel assembly can pivot relative to said one drawbar in moving the latter from the work to the transport position; a support wheel attached to the outer end of said other drawbar; a hitch on each drawbar for attachment to an implement, the hitch on said one drawbar trailing behind that on said other drawbar in the work position; and a pair of stay bars each having one end pivotally connected to the hitch bar so as to be swingable in a substantially horizontal plane between work and transport positions, one stay bar in its work position being connectable by a fastening to said wheel assembly to hold said one drawbar in said work position, and the other stay bar in its work position being connectable by a fastening to said other drawbar to hold it in said work position.

2. A hitch assembly as claimed in claim 1 which said connection between said one drawbar and the wheel assembly includes a removable fastening that serves to hold the wheel assembly in a fixed orientation relative to the drawbar with the wheel axis extending laterally in the work position.

3. A hitch as claimed in claim 1 in which the wheel assembly comprises a pair of horizontal parallel plates joined by a web along their outer edge, the outer end of said one drawbar and the respective stay bar being received between said plates.

4. A hitch assembly as claimed in claim 1 in which the hitch for said one drawbar is carried on the wheel assembly.

5. A hitch assembly as claimed in claim 1 in which said one drawbar extends substantially rearwards parallel to said respective stay bar in the transport position.

6. A hitch assembly as claimed in claim 1 in which said other drawbar is held in its transport position by the respective stay bar to which it is connected by a removable fastening, said other drawbar assuming an orientation in which it trails at an angle to the direction of travel when in its transport position.

7. A hitch assembly as claimed in claim 6 in which said other drawbar and said respective stay bar are swingable to storage positions in which they extend substantially rearwards parallel to one another.

* * * * *